US009760718B2

(12) United States Patent
Braghin et al.

(10) Patent No.: US 9,760,718 B2
(45) Date of Patent: Sep. 12, 2017

(54) UTILITY-AWARE ANONYMIZATION OF SEQUENTIAL AND LOCATION DATASETS

(71) Applicant: International Business Machines Corporation, Armonk, NY (US)

(72) Inventors: Stefano Braghin, Dublin (IE); Aris Gkoulalas-Divanis, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 14/857,887

(22) Filed: Sep. 18, 2015

(65) Prior Publication Data

US 2017/0083708 A1 Mar. 23, 2017

(51) Int. Cl.

*G06F 12/14* (2006.01)
*G06F 21/60* (2013.01)
*G06F 17/30* (2006.01)

(52) U.S. Cl.

CPC ........ *G06F 21/60* (2013.01); *G06F 17/30371* (2013.01)

(58) Field of Classification Search

CPC ........................... G06F 21/60; G06F 17/30371
USPC ............................................... 726/26, 23, 25
See application file for complete search history.

(56) References Cited

U.S. PATENT DOCUMENTS

| | | | |
|---|---|---|---|
| 7,401,233 B2 | 7/2008 | Duri et al. | |
| 8,423,791 B1 | 4/2013 | Yu et al. | |
| 8,639,221 B1 | 1/2014 | Zang et al. | |
| 8,812,524 B2 | 8/2014 | Chen et al. | |
| 2010/0064373 A1 | 3/2010 | Cai et al. | |
| 2013/0269038 A1 | 10/2013 | Takahashi | |
| 2014/0115715 A1 | 4/2014 | Pasdar | |
| 2014/0123304 A1 | 5/2014 | Rachlin et al. | |
| 2014/0130178 A1 | 5/2014 | Agrawal et al. | |
| 2014/0304825 A1 | 10/2014 | Gianniotis et al. | |
| 2015/0381637 A1* | 12/2015 | Raff | H04L 63/0218 726/23 |

OTHER PUBLICATIONS

Abul, Osman et al., "Anonymization of moving objects databases by clustering and perturbation", Elsevier Science Ltd., Information Systems, vol. 35, Issue 8, Dec. 2010, pp. 884-910.

Abul, Osman et al., "Never Walk Alone: Uncertainty for Anonymity in Moving Objects Databases", Proceedings of the 2008 IEEE 24th International Conference on Data Engineering, ICDE 2008, Cancun, Mexico, Apr. 7-12, 2008, 10 pages.

(Continued)

*Primary Examiner* — Aravind Moorthy
(74) *Attorney, Agent, or Firm* — Francis Lammes; Stephen J. Walder, Jr.; Kurt P. Goudy

(57) ABSTRACT

A mechanism is provided for anonymizing sequential and location datasets. Responsive to receiving the sequential and location datasets from an enterprise, the sequential and location datasets are scanned to expose a set of privacy vulnerabilities. A set of privacy constraints P is generated based on the set of discovered privacy vulnerabilities and a set of utility constraints U is identified. The sequential and location datasets is anonymized using the set of privacy constraints P and the set of utility constraints U thereby forming an anonymized dataset. The anonymized dataset is then returned to the enterprise.

13 Claims, 8 Drawing Sheets

(56) References Cited

OTHER PUBLICATIONS

Mohammed, Noman et al., "Walking in the Crowd: Anonymizing Trajectory Data for Pattern Analysis", Proceedings of the 18th ACM Conference on Information and Knowledge Management, CIKM'09, Hong Kong, China, Nov. 2-6, 2009, pp. 1441-1444.

Monreale, Anna et al., "Anonymity preserving sequential pattern mining", Springer Netherlands, Artificial Intelligence and Law, vol. 22, Issue 2, Jun. 2014, pp. 141-173.

Monreale, Anna et al., "C-safety: a framework for the anonymization of semantic trajectories", Transactions on Data Privacy, vol. 4 Issue 2, Aug. 2011, pp. 73-101.

Monreale, Anna et al., "Movement Data Anonymity through Generalization", Transactions on Data Privacy, vol. 3 Issue 2, Aug. 2010, pp. 91-121.

Nergiz, Mehmet E. et al., "Towards Trajectory Anonymization: a Generalization-Based Approach", ACM SPRINGL'08, Irvine, California, Nov. 4, 2008, pp. 52-61.

Poulis, Giorgos et al., "Apriori-based algorithms for $k^m$-anonymizing trajectory data", Transactions on Data Privacy, vol. 7, Issue 2, Aug. 2014, pp. 165-194.

Yarovoy, Roman et al., "Anonymizing Moving Objects: How to Hide a MOB in a Crowd?", Proceedings of the 12th International Conference on Extending Database Technology: Advances in Database Technology, EDBT 2009, Saint Petersburg, Russia, Mar. 24-26, 2009, 12 pages.

* cited by examiner

400

```
Input: Dataset D, privacy constraints P, anonymity value k, utility constraints U

401 - 1.  D' ← D
402 - 2.  P ← sort (P)
403 - 3.  while (P is not empty)
404 - 4.       p ← first_element (P)
405 - 5.       while (sup(p, D') < k && sup(p, D') != 0)
406 - 6.            find item i in p having the minimum support in D'
407 - 7.            find utility constraint u in U, containing item i
408 - 8.            find item j (with j different to i) in u having the minimum sum of indexes in lists:
                         list L1 ← list of all locations in u sorted in increasing spatial distance from i
                                   (and within acceptable distance, if such is specified)
                         list L2 ← list of all locations in u sorted in increasing temporal distance from i
                                   (and within acceptable distance, if such is specified)
409 - 9.            if (item j is found)
410 - 10.                generalize (i, j)
411 - 11.           else
412 - 12.                suppress (i)
413 - 13.           update D'
414 - 14.      delete (p)
415 - 15. return D'

Output: Anonymous dataset D' corresponding to D
```

*FIG. 4*

UTILITY-AWARE ANONYMIZATION OF SEQUENTIAL AND LOCATION DATASETS

BACKGROUND

The present application relates generally to an improved data processing apparatus and method, and more specifically to mechanisms for utility-aware anonymization of sequential and location datasets.

Data anonymization algorithms are becoming increasingly important to support modern business' needs for data sharing and data monetization. Due to worldwide privacy regulations governing different types of person-specific data, such as patient data in electronic health records, user mobility data in telco datasets, or the like, such data has to be anonymized before shared with third parties. Telco data anonymization is an important research area, as user location information is largely collected by telco operators, exposing the precise locations and corresponding times those individuals visited them. Such data poses a severe threat to privacy; yet, when anonymized, telco data is useful in supporting many applications, such as urban planning, infrastructure allocation, or the like.

Existing privacy solutions for location data either anonymize entire user trajectories or simplify the problem to that of anonymizing sequences of points of interest (POIs) visited by individuals represented in the data set, thereby discarding important temporal information from the data. These existing solutions lead to significant data distortion as they tend to overprotect the mobility data, either by concealing entire user trajectories or by protecting all m combinations of POIs visited by individuals and removing any associated temporal information. Existing solutions for concealing entire user trajectories falsify the data as they either enforce space/time translation to "move" trajectories close to each other prior to anonymizing them, or introduce synthetic data to conceal the real user trajectories. Such solutions require extensive parameterization from the data owner, such as to set Quasi-identifiers (QIDs) either for the entire dataset or on a per-user basis, to set the value of m for protecting user m sequences, to provide taxonomies of locations, to define sensitive locations, or the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for anonymizing sequential and location datasets. The illustrative embodiment scans the sequential and location datasets to expose a set of privacy vulnerabilities in response to receiving the sequential and location datasets from an enterprise. The illustrative embodiment generates a set of privacy constraints P based on the set of discovered privacy vulnerabilities. The illustrative embodiment identifies a set of utility constraints U. The illustrative embodiment anonymizes the sequential and location datasets using the set of privacy constraints P and the set of utility constraints U thereby forming an anonymized dataset. The illustrative embodiment returns the anonymized dataset to the enterprise.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts one exemplary implementation of the process performed by anonymization logic anonymizing a received dataset in accordance with an illustrative embodiment;

DETAILED DESCRIPTION

Figure 1:
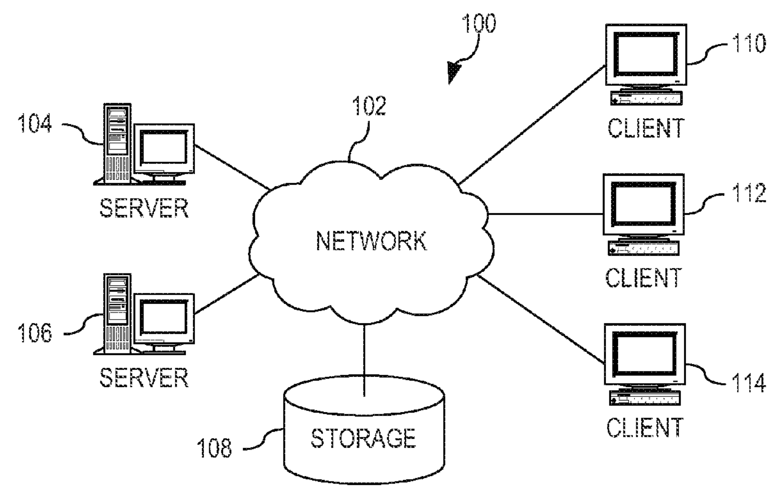
FIG. 1 is an example diagram of a distributed data processing system in which aspects of the illustrative embodiments may be implemented.

The illustrative embodiments provide mechanisms for utility-aware anonymization of sequential and location datasets. As noted above, existing solutions to data anonymization either anonymize entire user trajectories or simplify the problem to that of anonymizing sequences of points of interest (POIs), thereby discarding important temporal information from the data. Given the need to anonymize sequential and location datasets without losing important temporal information, the mechanisms of the illustrative embodiments anonymize the sequential and location datasets adhering to privacy and utility constraints, where privacy constraints are automatically extracted from the data through a vulnerability identification tool. By first discovering privacy vulnerabilities and then performing utility-constrained generalization, the illustrative embodiments offer privacy guarantees on the level of anonymity achieved.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of" and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
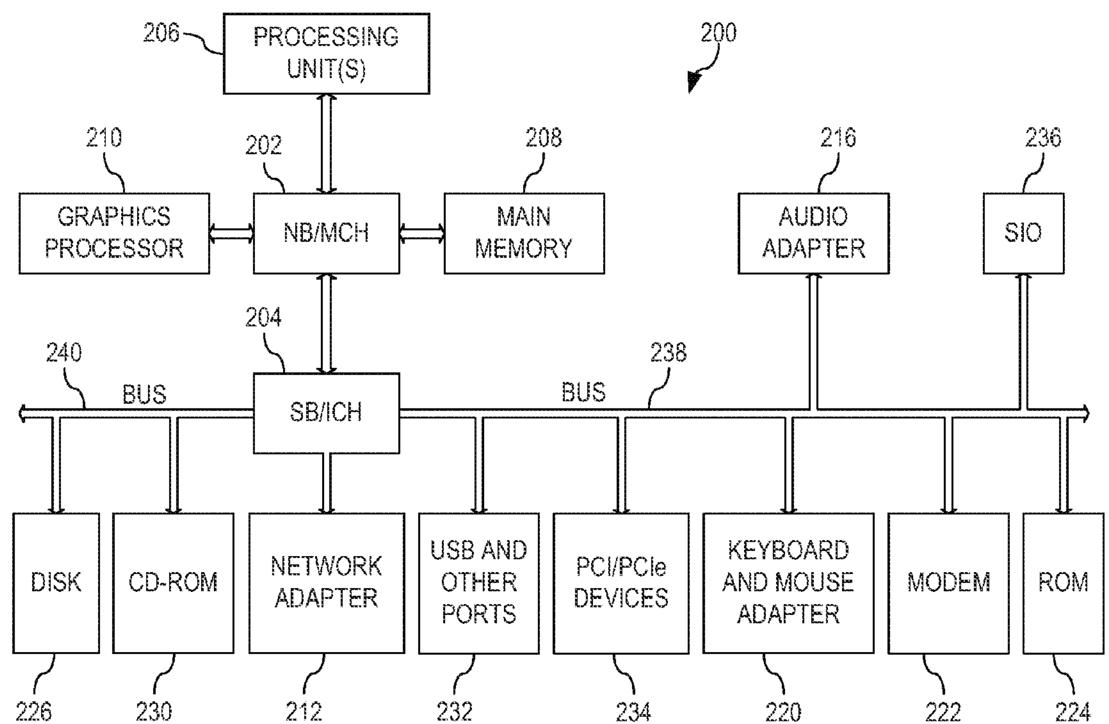
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard t the environments in which the illustrative embodiments of the present invention may be implemented.

As shown in FIG. 1, one or more of the computing devices, e.g., server 104, may be specifically configured to implement a mechanism for anonymizing user-related sequential and location datasets. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a. computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the anonymization of user-related sequential and location datasets.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240, HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the anonymization of user-related sequential and location datasets.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As noted above, data ananymization is important to support modem business' needs for data sharing and data monetization, such as in patient data in electronic health records, user mobility data in telco datasets, or the like, when such data has to be anonymized before shared with third parties. Thus, the utility-aware anonymization mechanisms of the illustrative embodiments may be utilized in any type of business where data anonymization is important.

While the remaining descriptions provide one exemplary type of data anonymization with regard to telco data, it will be apparent to those of ordinary skill in the art in view of the present description that the utility-aware anonymization mechanisms may be utilized in addition to, or in replacement of, the examples provided herein without departing from the spirit and scope of the present invention.

With regard to telco anonymization, existing algorithms for anonymizing such data either protect the entire trajectories by building cylindrical volumes containing many user trajectories or simplify the privacy-protection problem to that of anonymizing sequences of Places Of Interest (POIs), by discarding the time component. All such anonymization algorithms lead to high data distortion, falsify the data, and do not provide any utility guarantees. Moreover, existing algorithms that simplify the privacy-protection problem require the specification of Quasi-Identifiers (QIDs), i.e. sequences of POIs provided by the data owner, in order to anonymize the data. In order to overcome these issues, the illustrative embodiments provide ways for anonymizing sequential and location datasets based on privacy and utility constraints. That is, the utility-aware anonymization mechanisms of the illustrative embodiments automatically discover vulnerabilities in such datasets and use these vulnerabilities to automatically set the privacy constraints.

Figure 3:
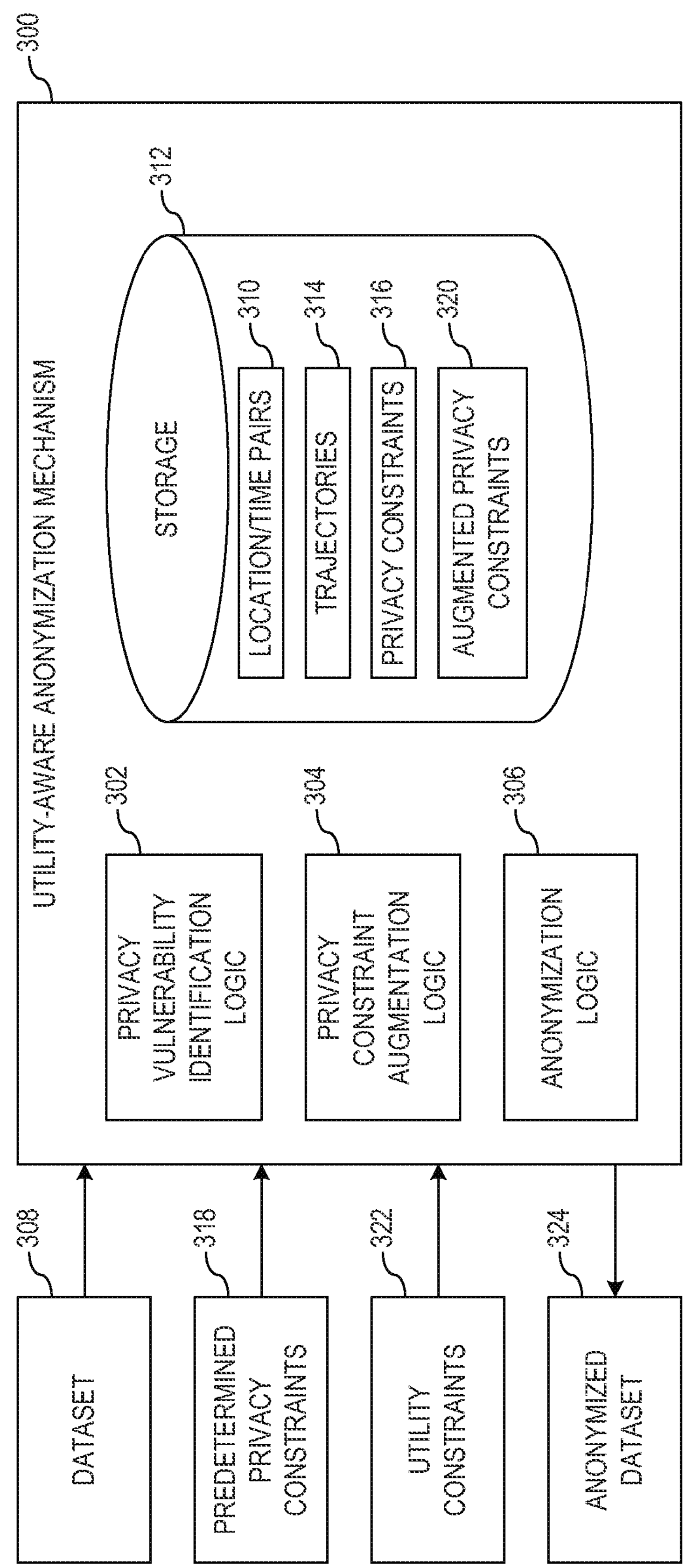
FIG. 3 depicts a functional block diagram of a utility-aware anonymization mechanism for anonymizing sequential and location datasets based on privacy and utility constraints in accordance with an illustrative embodiment.

FIG. 3 depicts a functional block diagram of a utility-aware anonymization mechanism for anonymizing sequential and location datasets based on privacy and utility constraints in accordance with an illustrative embodiment. Utility-aware anonymization mechanism 300, which may be executed in a data processing system such as data processing system 200 of FIG. 2, comprises privacy vulnerability identification logic 302, privacy constraint augmentation logic 304, and anonymization logic 306. Responsive to receiving dataset 308 from an enterprise, such as a healthcare company, a telco company, or the like, privacy vulnerability identification logic 302 scans the received dataset 308 to expose privacy vulnerabilities.

A privacy vulnerability may be any information that leads to the re-identification of a user and/or the user's association to sensitive information, such as:

- minimal combinations of locations (or locations/times) that if known by another person, the other person can uniquely expose the user in the anonymized dataset,
- sets/sequences of locations (or locations/times) that are frequently visited by the user and infrequently visited by many other users, and
- points of interest (POIs) characterized by the owner of the dataset as sensitive, such as hospitals, clinics, churches, or the like.

In order to discover a set of minimal combinations of locations (locations/times) that are unsafe, privacy vulnerability identification logic 302 identifies locations where the user has frequented, i.e. POIs, by superimposing a grid over the map of POIs. Privacy vulnerability identification logic 302 then associates times when the locations were visited into time-intervals. For each distinct identified location/time pair that appears in the received dataset 308, privacy vulnerability identification logic 302 calculates its frequency of occurrence in the received dataset 308. For all location/time pairs that appear only once in the received dataset 308, privacy vulnerability identification logic 302 records the location/time pair as unsafe in unsafe location/time pair data structure 310 in storage 312. For all the remaining location/time pairs, privacy vulnerability identification logic 302 operates in a level-wise breadth-first search (BFS) to:

- scan each trajectory and produce all two-location/time pairs that appear in the trajectory,
- record in a trajectory data structure 314 a list of all identified distinct two-location/time pairs that were found,
- check each identified two-location/time pair for uniqueness and, if a two-location/time pair is found to be unique, record the location/time pair as unsafe in unsafe location/time pair data structure 310 in storage 312, and
- repeat the process for increasingly larger location/time pairs (i.e., three-location/time pairs, four-location/time pairs, etc.), without checking any supersets of any already recorded two-, three-, four-, etc.-location/time pairs.

For each unsafe location/time pair, privacy vulnerability identification logic 302 generates a privacy constraint p in privacy constraint data structure 316 in storage 312.

In order to discover a set of sets/sequences of locations (or locations/times) that are frequently visited by the user and infrequently visited by many other users, privacy vulnerability identification logic 302 identifies locations that are frequently visited by the user and infrequently visited by many other users, i.e. POIs, by superimposing a grid over the map of POIs. Privacy vulnerability identification logic 302 then associates times when the locations were visited into time-intervals. For each distinct identified location/time pair that appears in the received dataset 308, for each user in the dataset, privacy vulnerability identification logic 302 operates to:

- given a pre-specified time periodicity (e.g., day, week, etc.), produce a transaction of the user following this time periodicity thereby forming a set of transactions; and
- execute a location/time pair pattern mining algorithm (e.g., Apriori) on these transactions to reveal frequent location/time pairs of user in the received dataset 308. Apriori is an algorithm for frequent item set mining and association rule learning over transactional databases. Apriori proceeds by identifying the frequent individual items in the database and extending them to larger and larger item sets as long as those item sets appear sufficiently often in the database.

Then, for each identified frequent location/time pair of a user in the received dataset 308, if the same location/time pair is found to be infrequent for at most a predetermined percentage of other users in the received dataset 308, privacy vulnerability identification logic 302 generates a privacy constraint p in privacy constraint data structure 316 in storage 312. The predetermined percentage may be a user-defined percentage with a value, with values ranging between two and five percent being more meaningful.

Thus, privacy vulnerability identification logic 302 scans the received dataset 308 to expose privacy vulnerabilities and generate a set of privacy constraints P in privacy constraint data structure 316, which state what location/time pairs are sensitive in the received dataset 308 and require protection (e.g., specific locations, sequences of POIs visited and corresponding times, frequently visited locations, or the like). Once the set of privacy constraints P are generated, privacy constraint augmentation logic 304 determines whether the owner of the received dataset 308 has any predetermined privacy constraints 318. If there are predetermined privacy constraints 318, privacy constraint augmentation logic 304 augments the predetermined privacy constraints 318 based on the privacy constraints P in privacy constraint data structure 316. That is, the privacy constraints P in privacy constraint data structure 316 supersede the predetermined privacy constraints 318 because the privacy constraints P in privacy constraint data structure 316 provide greater anonymity due to the structure of the received dataset 308. Accordingly, privacy constraint augmentation logic 304 augments predetermined privacy constraints 318 based on privacy constraints P in privacy constraint data structure 316 and generates a set of augmented privacy constraints AP 320 that comprises all of the privacy constraints P in privacy constraint data structure 316 and one or more augmented privacy constraints from the predetermined privacy constraints 318. The set of augmented privacy constraints AP 320 is then provided to anonymization logic 306.

In addition to receiving the set of augmented privacy constraints AP 320, anonymization logic 306 may also receive a set of utility constraints U 322. The set of utility constraints 322 are a set of requirements that must be respected by the anonymization approach in order to lead to an anonymized dataset that remains useful for subsequent analysis. Some examples of a utility constraint are:

- a set of locations or points of interest (POIs) that are only allowed to be generalized together and with no other POIs, such as schools, hospitals, doctors' offices, restaurants, or the like, in order to maintain semantic similarity of the visited POIs as released in the anonymized dataset;
- the set of locations or POIs provided as a hierarchy of POIs;
- a maximum size of a generalized item, such that at most x locations or POIs are allowed to be generalized together, the more the locations that are generalized together, the lower the utility of the anonymized dataset, as the higher becomes location imprecision;
- a maximum distance between two POIs that may be generalized together, such as 100 meters, 50 meters, or the like, in order to allow for generalizations that conform to spatial locality;
- a maximum time-difference in visited locations that may be generalized together, such as 10 minutes, 20 minutes, or the like, in order to lower the imprecision about the whereabouts of the user for an increased amount of time; and/or
- a maximum number of locations or Pals that are allowed to be suppressed in the received dataset 308, in order to accommodate more precise subsequent data analysis.

Thus, the set of utility constraints U 322 state which data transformations are allowable in order to protect the data in a way that preserves data utility (e.g., only POIs of the same type may be generalized together, only cells within set proximity may be generalized together, only sets of cells visited within specific times may be generalized together, only a maximum number of POIs may be suppressed, or the like). The set of utility constraints U 322 are provided as an input to anonymization logic 306.

Utilizing the set of augmented privacy constraints AP 320 and the set of utility constraints U 322, anonymization logic 306 anonymizes the received dataset 308. In doing so, anonymization logic 306 orders all the set of augmented privacy constraints AP 320 based on a satisfiability criterion, for example, from easiest to most difficult to satisfy (e.g., in terms of data transformations that have to be applied in order to satisfy a privacy constraint). For each privacy constraint p in the set of augmented privacy constraints AP 320, anonymization logic 306 performs a spatiotemporal generalization based on the set of utility constraints U 322 in order to satisfy the privacy constraint p. If the privacy constraint p cannot be satisfied using spatiotemporal generalization alone (e.g., because this would violate one or more utility constraints), anonymization logic 306 performs selective suppression of location/time pairs in the privacy constraint p based on the set of utility constraints U 322. If the set of utility constraints U 322 still prevents the satisfaction of the privacy constraint p, anonymization logic 306 disregards the utility constraints for the privacy constraint p and satisfies the privacy constraint p. This guarantees that the privacy constraints are always satisfied in the anonymized dataset, hence the necessary level of privacy is offered. Anonymization logic 306 then updates the received dataset 308 accordingly in order to reflect the enforced data transformations (i.e., data generalizations and/or suppressions) thereby generating an anonymized dataset 324. Once anonymization logic 306 analyzes all privacy constraints p in the set of augmented privacy constraints AP 320, anonymization logic 306 returns the anonymized dataset 324 to the enterprise.

FIG. 4 depicts one exemplary implementation of the process performed by anonymization logic, such as anonymization logic 306 of FIG. 3, in anonymizing a received dataset in accordance with an illustrative embodiment. In process 400, the anonymization logic receives, as input, a dataset D, privacy constraints P, anonymity value k, and utility constraints U. At step 401, the anonymization logic initializes dataset D' to dataset D. At step 402, the anonymization logic orders the constraints in P in decreasing support count, where the support count reflects the number of records (equiv. trajectories) in the dataset that contain all POIs that appear in P. Step 402 represents an efficient way of dealing with privacy constraints, where the constraints are sorted a-priori based on some satisfiability criterion (e.g., based on the support count), and are subsequently processed in this order, until they are all protected in the dataset D'. This is only one possible implementation and alternative strategies for processing privacy constraints may also be enforced without departing from the spirit and scope of the invention. As an example, the constraints may be dynamically reordered by a sanitization algorithm, based on modifications to the dataset caused by the processing of previous constraints.

At step 403, for each privacy constraint p in the set of privacy constraints P, the anonymization logic iterates as long as there remain constraints to be satisfied. Thus, at step 404, the anonymization logic reads the first privacy constraint p and, at step 405, while the privacy constraint p is not satisfied, at step 406, the anonymization logic finds an item location i in privacy constraint p having the minimum support in D'. At step 407, the anonymization logic finds a utility constraint u in utility constraints U, containing item location i and, at step 408, finds item location j (with j different to i) in constraint u having the minimum sum of indexes in lists: such as list L1 which is a list of all locations in utility constraint u sorted in increasing spatial distance from item location i and, if specified, within an acceptable distance, and list L2, which is a list of all locations in utility constraint u sorted in increasing temporal distance from item location i and, if specified, within an acceptable distance. This proposed generalization technique is based on two ordered lists (list L1 and list L2) that are generated based on the spatial (list L1) and the temporal (list L2) distances of the candidate location/time pairs. As an example of applying this technique, consider that item (i.e., location/time pair) i needs to be generalized with item j or item k or item m. The anonymization logic computes the following values: spatial_distance (i,j), spatial_distance (i,k), spatial_distance (i,m), temporal_distance (i,j), temporal_distance (i,k), and temporal_distance(i,m). The anonymization logic then ranks items j, k, and in based on the computed spatial distances in increasing order (that is list L1) and, separately, the anonymization logic ranks these items based on the temporal distances in increasing order (that is list L2). The anonymization logic then selects to generalize i with the item (j, k, or m) whose sum of indexes in the two ordered lists is smaller. The identified item is spatio-temporally closer to item i.

At step 409, if the anonymization logic finds an item location j, then, at step 410, the anonymization logic generalizes (i,j). There are multiple ways of implementing the generalization (i,j) function. For example, one way is to aggregate the corresponding locations and time-periods (i.e., location/time pairs i and j) by forming a new, generalized item G=i_j, and subsequently replace any occurrence of the original items i and j the dataset D', with the generalized item G. At step 411, if the anonymization logic fails to find an item location j, then, at step 412, the anonymization logic suppress item location i. At step 413, the anonymization logic updates the dataset D' by replacing i,j with generalized (i,j) or suppresses i from trajectories in dataset D'. At step 414, the anonymization logic then deletes privacy constraint p from privacy constraints P, since privacy constraint p is now satisfied and thus, may be removed from P, and moves to the next privacy constraint p. Once all the privacy constraints p in privacy constraints P have been addressed, then at step 415, the anonymization logic return dataset D'. That is, the anonymization logic outputs dataset D' corresponding to dataset D.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays, (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or Hock diagram block or blocks.

Figure 5:
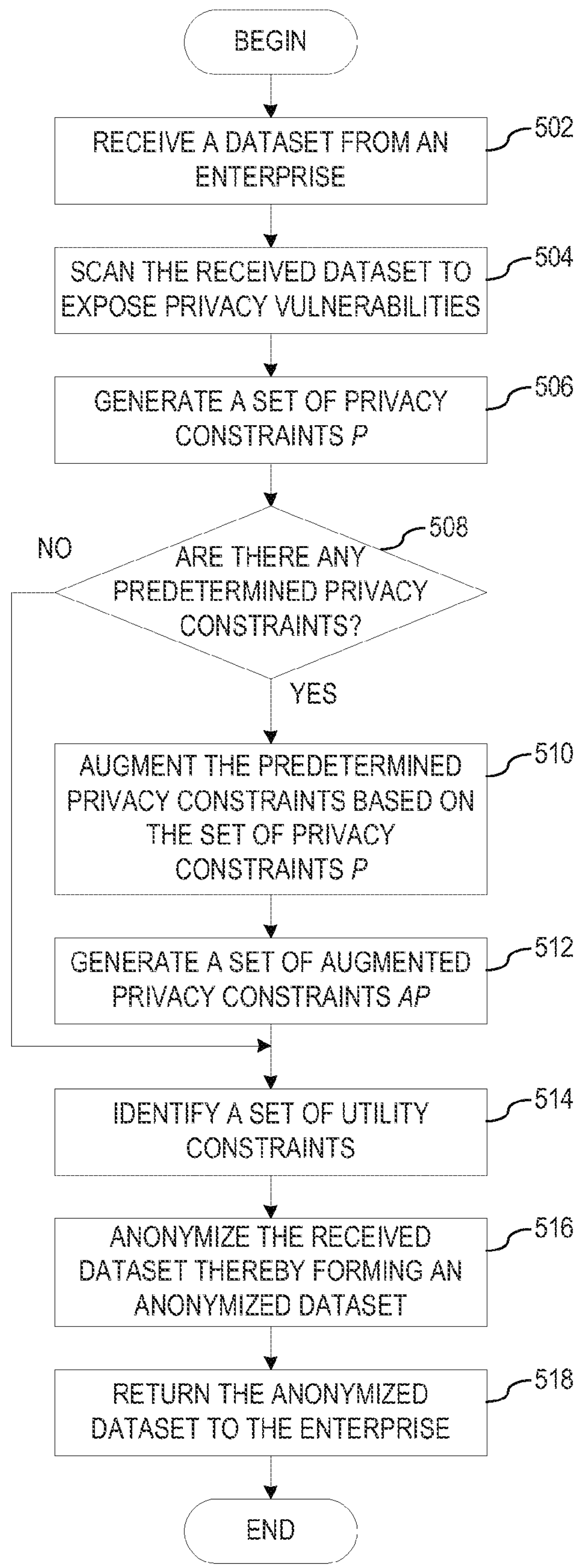
FIG. 5 depicts an overall flowchart of the operation performed by a utility-aware anonymization mechanism for anonymizing sequential and location datasets based on privacy and utility constraints in accordance with an illustrative embodiment.

FIG. 5 depicts an overall flowchart of the operation performed by a utility-aware anonymization mechanism for anonymizing sequential and location datasets based on privacy and utility constraints in accordance with an illustrative embodiment. As the operation begins, the utility-aware anonymization mechanism receives a dataset from an enterprise (step 502). The utility-aware anonymization mechanism scans the received dataset to expose privacy vulnerabilities (step 504). Based on the identified privacy vulnerabilities, the utility-aware anonymization mechanism generates a set of privacy constraints P (step 506). The utility-aware anonymization mechanism determines whether there are any predetermined privacy constraints (step 508). If at step 508 there are any predetermined privacy constraints, the utility-aware anonymization mechanism augments the predetermined privacy constraints based on the set of privacy constraints P (step 510) and generates a set of augmented privacy constraints AP (step 512).

Figure 6:
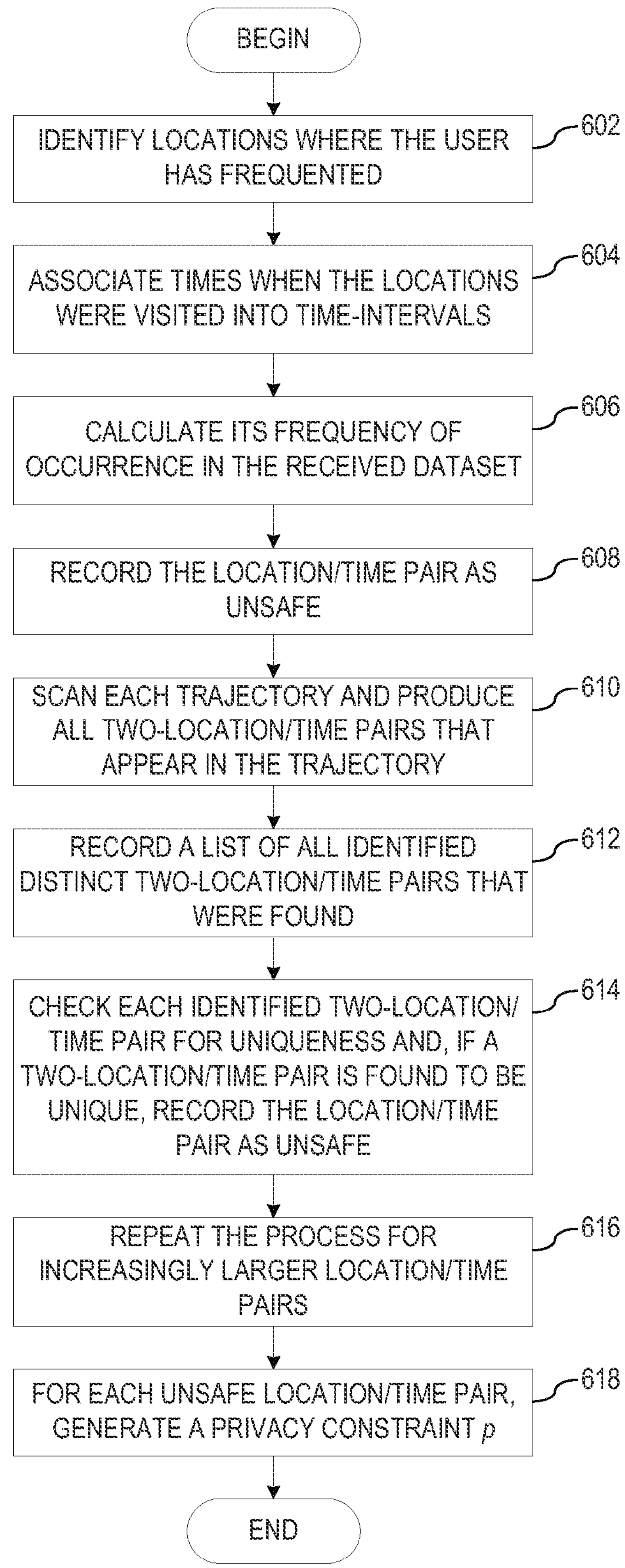
FIG. 6 depicts a flowchart of the operation performed by the utility-aware anonymization mechanism in exposing the privacy vulnerabilities via discovering a set of minimal combinations of locations (or locations/times) that are unsafe in accordance with an illustrative embodiment.

If at step 508 there fails to be any predetermined privacy constraints or from step 512, the utility-aware anonymization mechanism identifies a set of utility constraints (step 514). Utilizing the set of augmented privacy constraints AP/privacy constraints P and the set of utility constraints U, the utility-aware anonymization mechanism anonymizes the received dataset thereby forming an anonymized dataset (step 516). The utility-aware anonymization mechanism then returns the anonymized dataset to the enterprise (step 518), with the operation terminating thereafter, FIG. 6 depicts a flowchart of the operation performed by the utility-aware anonymization mechanism in exposing the privacy vulnerabilities via discovering a set of minimal combinations of locations (or locations/times) that are unsafe of step 504 in FIG. 5 in accordance with an illustrative embodiment. As the operation begins, in order to discover a set of minimal combinations of locations (or locations/times) that are unsafe, the utility-aware anonymization mechanism identifies locations where the user, i.e. POIs, has frequented by superimposing a grid over a map of points of interest (POIs) (step 602). The utility-aware anonymization mechanism associates times when the locations were visited into time-intervals (step 604). For each distinct identified location/time pair that appears in the received dataset, the utility-aware anonymization mechanism calculates its frequency of occurrence in the received dataset (step 606). For all location/time pairs that appear only once in the received dataset, the utility-aware anonymization mechanism records the location/time pair as unsafe in an unsafe location/time pair data structure (step 608).

For all the remaining location/time pairs, the utility-aware anonymization mechanism operates in a level-wise breadth-first search (BFS) to:

- scan each trajectory and produce all two-location/time pairs that appear in the trajectory (step 610),
- record in a trajectory data structure a list of all identified distinct two-location/time pairs that were found (step 612),
- check each identified two-location/time pair for uniqueness and, if a two-location/time pair is found to be unique, record the location/time pair as unsafe in the unsafe location/time pair data structure in storage (step 614), and
- repeat the process for increasingly larger location/time pairs (i.e., three-location/time pairs, four-location/time pairs, etc.), without checking any supersets of any already recorded two-, three-, four-, etc.-location/time pairs (step 616).

For each unsafe location/time pair, the utility-aware anonymization mechanism generates a privacy constraint p in a privacy constraint data structure (step 618), with the operation terminating thereafter.

Figure 7:
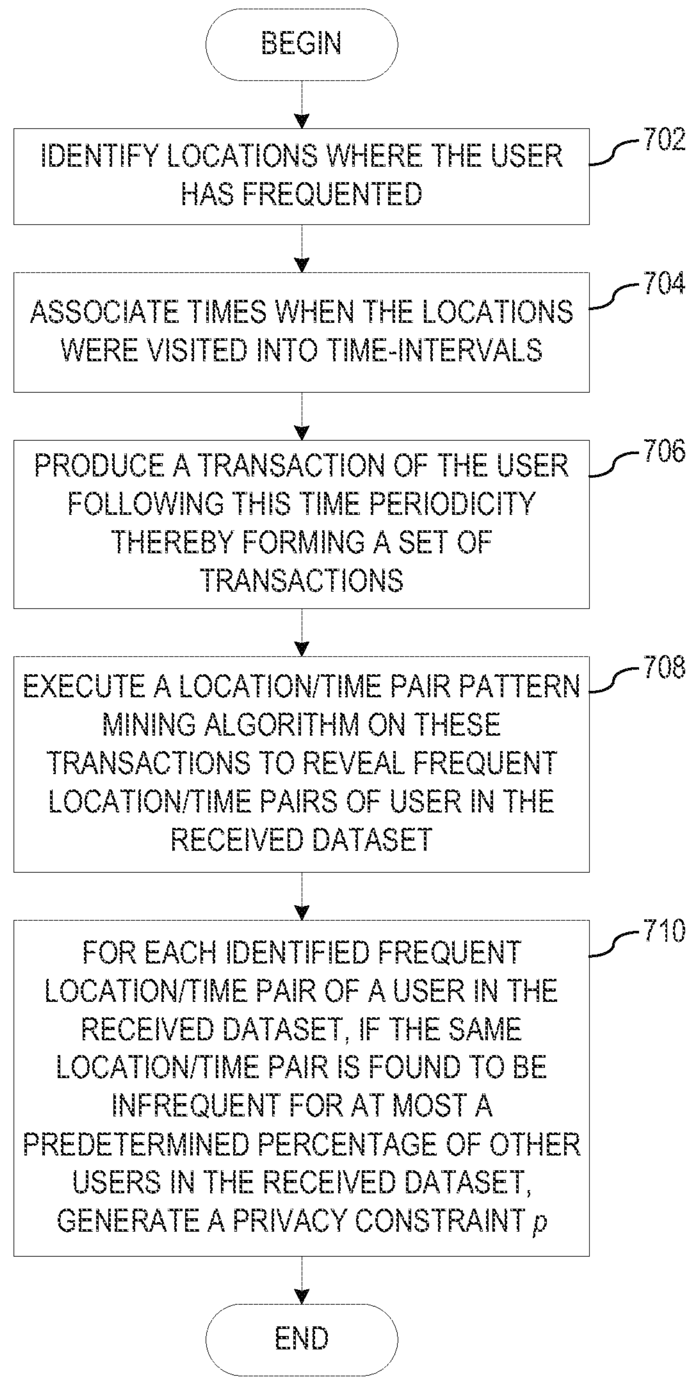
FIG. 7 depicts a flowchart of the operation performed by the utility-aware anonymization mechanism in exposing the privacy vulnerabilities via discovering a set of sets/sequences of locations (or locations/times) that are frequently visited by the user and infrequently visited by many other users in accordance with an illustrative embodiment.

FIG. 7 depicts a flowchart of the operation performed by the utility-aware anonymization mechanism in exposing the privacy vulnerabilities via discovering a set of sets/sequences of locations (or locations/times) that are frequently visited by the user and infrequently visited by many other users of step 504 in FIG. 5 in accordance with an illustrative embodiment. As the operation begins, in order to discover a set of sets/sequences of locations (or locations/times) that are frequently visited by the user and infrequently visited by many other users, the utility-aware anonymization mechanism identifies locations that are frequently visited by the user and infrequently visited by many other users, i.e. POIs, by superimposing a grid over the map of POIs (step 702). The utility-aware anonymization mechanism associates times when the locations were visited into time-intervals (step 704). For each distinct identified location/time pair that appears in the received dataset and for each user in the dataset, the utility-aware anonymization mechanism:

- given a pre-specified time periodicity (e.g., day, week, etc.), produces a transaction of the user following this time periodicity thereby forming a set of transactions (step 706); and
- execute a location/time pair (equiv. considered as an item) pattern mining algorithm (e.g., Apriori) on these transactions to reveal frequent location/time pairs (equiv. consider as an item sets of user in the received dataset (step 708).

Then, for each identified frequent location/time pair of a user in the received dataset, if the same location/time pair is found to be infrequent for at most a predetermined percentage of other users in the received dataset, the utility-aware anonymization mechanism generates a privacy constraint p in the privacy constraint data structure (step 710), with the operation terminating thereafter.

Figure 8:
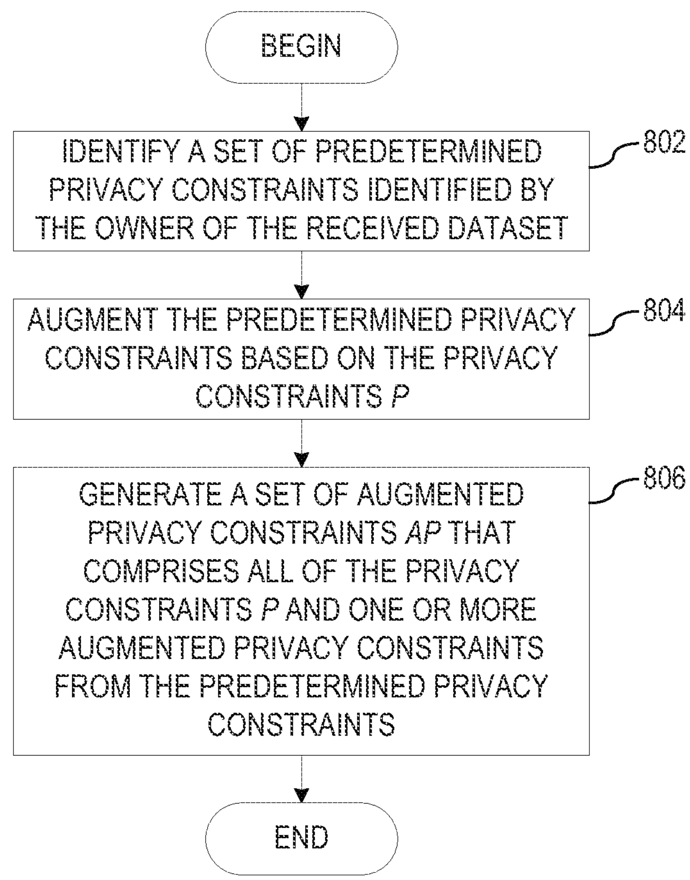
FIG. 8 depicts a flowchart of the operation performed by the utility-aware anonymization mechanism in augmenting any predetermined privacy constraints based on a set of generated privacy constraints P in accordance with an illustrative embodiment.

FIG. 8 depicts a flowchart of the operation performed by the utility-aware anonymization mechanism in augmenting any predetermined privacy constraints based on a set of generated privacy constraints P of step 510 in FIG. 5 in accordance with an illustrative embodiment. As the operation begins, the utility-aware anonymization mechanism identifies a set of predetermined privacy constraints identified by the owner of the received dataset (step 802), e.g., based on his or her domain knowledge. As the privacy constraints P in privacy constraint data structure supersede the predetermined privacy constraints because the privacy constraints P provide greater anonymity due to the structure of the received dataset, the utility-aware anonymization mechanism augments the predetermined privacy constraints based on the privacy constraints P (step 804). The utility-aware anonymization mechanism then generates a set of augmented privacy constraints AP that comprises all of the privacy constraints P and one or more augmented privacy constraints from the predetermined privacy constraints (step 806), with the operation terminating thereafter.

Figure 9:
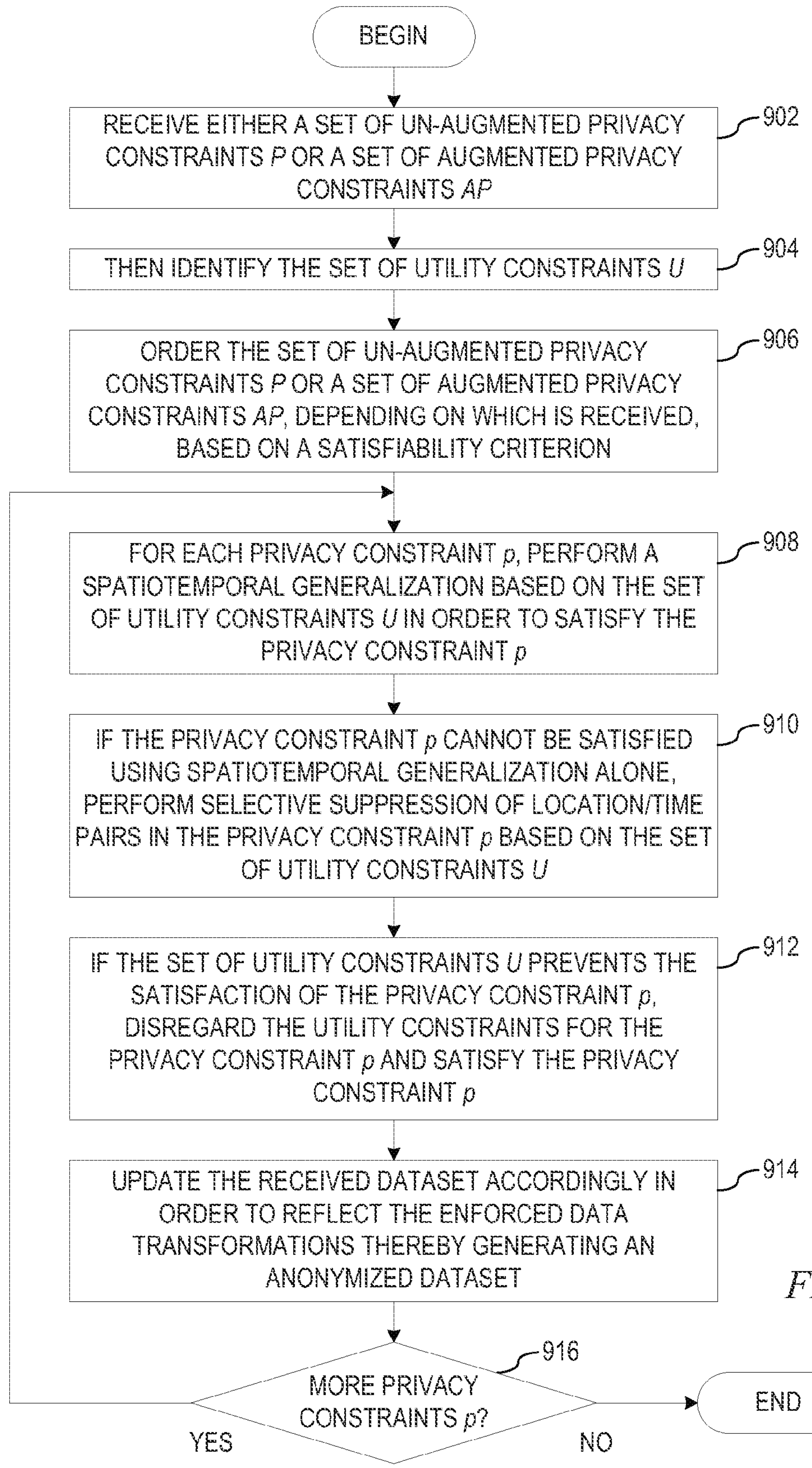
FIG. 9 depicts a flowchart of the operation performed by the utility-aware anonymization mechanism in anonymizing the received dataset in accordance with an illustrative embodiment.

FIG. 9 depicts a flowchart of the operation performed by the utility-aware anonymization mechanism in anonymizing the received dataset of step 514 in FIG. 5 in accordance with an illustrative embodiment. As the operation begins, the utility-aware anonymization mechanism receives either a set of un-augmented privacy constraints P if there fails to be any predetermined privacy constraints or a set of augmented privacy constraints AP if there is a set of predetermined privacy constraints (step 902). The utility-aware anonymization mechanism then identifies the set of utility constraints U (step 904). The utility-aware anonymization mechanism orders all the set of un-augmented privacy constraints P or a set of augmented privacy constraints AP, depending on which is received, based on a satisfiability criterion (step 906). For each privacy constraint p, the utility-aware anonymization mechanism performs a spatiotemporal generalization based on the set of utility constraints U in order to satisfy the privacy constraint p (step 908).

If the privacy constraint p cannot be satisfied using spatiotemporal generalization alone, the utility-aware anonymization mechanism performs selective suppression of location/time pairs in the privacy constraint p based on the set of utility constraints U (step 910). If the set of utility constraints U prevents the satisfaction of the privacy constraint p, the utility-aware anonymization mechanism disregards the utility constraints for the privacy constraint p and satisfies the privacy constraint p (step 912). The utility-aware anonymization mechanism then updates the received dataset accordingly in order to reflect the enforced data transformations (i.e., data generalizations and/or suppressions) thereby generating an anonymized dataset (step 914). The utility-aware anonymization mechanism then determines whether there is more privacy constraints p to analyze (step 916). If at step 916 there are more privacy constraints p to analyze, the operation returns to step 908. If at step 916 there are no more privacy constraints p to analyze, the operation terminates.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for utility-aware anonymization sequential and location datasets. Given the need to anonymize sequential and location datasets without losing important temporal information, the mechanisms of the illustrative embodiments anonymize sequential and location datasets adhering to privacy and utility constraints, where privacy constraints are automatically extracted from the data through a vulnerability identification tool. By first discovering privacy vulnerabilities and the performing utility-constrained generalization, the illustrative embodiments offer privacy guarantees on the level of anonymity achieved.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a computing device, causes the computing device to:

responsive to receiving sequential and location datasets from an enterprise, scan the sequential and location datasets to expose a set of privacy vulnerabilities;

generate a set of privacy constraints P based on the set of discovered privacy vulnerabilities;

identify a set of utility constraints U;

anonymize the sequential and location datasets using the set of privacy constraints P and the set of utility constraints U thereby forming an anonymized dataset; and return the anonymized dataset to the enterprise.

2. The computer program product of claim 1, wherein the computer readable program further causes the computing device to:

determine whether the enterprise identifies a set of predetermined privacy constraints;

responsive to the enterprise identifying the set of predetermined privacy constraints, augment the set of predetermined privacy constraints based on the set of privacy constraints P thereby forming a set of augmented privacy constraints AP; and incorporate the set of augmented privacy constraints AP into the set of privacy constraints P for use in anonymizing the sequential and location datasets.

3. The computer program product of claim 1, wherein the computer readable program to augment the set of predetermined privacy constraints based on the set of privacy constraints P further causes the computing device to:

identify the set of predetermined privacy constraints identified by the enterprise;

for each predetermined privacy constraint in the set of predetermined privacy constraints:

compare each predetermined privacy constraint in the set of predetermined privacy constraints to each privacy constraint p in the privacy constraints P; and responsive to a predetermined privacy constraint conflicting with a privacy constraint p, augment the predetermined privacy constraint such that no conflict remains thereby forming the set of augmented privacy constraints AP; and incorporate the set of augmented privacy constraints AP into the set of privacy constraints P for use in anonymizing the sequential and location datasets.

4. The computer program product of claim 1, wherein the computer readable program to scan the sequential and location datasets to expose the set of privacy vulnerabilities further causes the computing device to:

identify a set of locations a user has frequented;

associate a time value with each location in the set of locations;

for each distinct identified location/time pair:

calculate a frequency of occurrence in the sequential and location datasets;

for each location/time pair that appear only once in the sequential and location datasets, record the location/time pair as unsafe thereby indicating a privacy vulnerability;

for all the remaining location/time pairs:

scan a trajectory of each location time pair to produce one or more two-location/time pairs, responsive to identifying a unique two-location/time pair, record the two-location/time pair as unsafe thereby indicating a privacy vulnerability; and repeat the scanning and recording for increasingly larger location/time pairs without checking any supersets of already recorded location/time pairs; and for each recorded location/time pair, generate a privacy constraint p in the set of privacy constraints P.

5. The computer program product of claim 1, wherein the computer readable program to scan the sequential and location datasets to expose the set of privacy vulnerabilities further causes the computing device to:

identify a set of locations a user has frequented;

associate a time value with each location in the set of locations;

for each location/time pair that appear only once in the sequential and location datasets and for each user in the sequential and location datasets:

given a pre-specified time periodicity, produce a transaction of the user following this time periodicity thereby forming a set of transactions; and execute a location/time pair pattern mining algorithm on the set of transactions to reveal frequent location/time pairs of the user in the sequential and location datasets; and for each identified frequent location/time pair of the user in the sequential and location datasets, responsive to a same location/time pair being found to be infrequent for a predetermined percentage of other users in the sequential and location datasets, generate a privacy constraint p in the set of privacy constraints P.

6. The computer program product of claim 1, wherein the computer readable program to anonymize the sequential and location datasets using the set of privacy constraints P and the set of utility constraints U further causes the computing device to:

order the set of privacy constraints P based on a satisfiability criterion;

for each privacy constraint p in the set of privacy constraints P:

perform a spatiotemporal generalization based on the set of utility constraints U in order to satisfy the privacy constraint p;

responsive to satisfying the privacy constraint p using spatiotemporal generalization, generalize the privacy constraint;

responsive to an inability to satisfy the privacy constraint p using spatiotemporal generalization alone, perform selective suppression of location/time pairs associated with the privacy constraint p based on the set of utility constraints U;

responsive to the set of utility constraints U preventing the satisfaction of the privacy constraint p:

disregard the set of utility constraints U for the privacy constraint p; and satisfy the privacy constraint p; and update the sequential and location datasets in order to reflect the enforced data generalizations and suppressions, thereby generating the anonymized dataset.

7. The computer program product of claim 1, wherein the set of utility constraints comprises one or more of:

a set of locations or points of interest (POIs) that are only allowed to be generalized together and with no other POIs;

a maximum size of a generalized item, such that at a predetermined number of locations or POIs are allowed to be generalized together;

a maximum distance between two POIs that may be generalized together;

a maximum time-difference in visited locations that may be generalized together; or a maximum number of locations or POIs that are allowed to be suppressed in the sequential and location datasets.

8. An apparatus comprising:

a processor; and a memory coupled to the processor, wherein the memory comprises instructions which, when executed by the processor, cause the processor to:

responsive to receiving sequential and location datasets from an enterprise, scan the sequential and location datasets to expose a set of privacy vulnerabilities;

generate a set of privacy constraints P based on the set of discovered privacy vulnerabilities;

identify a set of utility constraints U;

anonymize the sequential and location datasets using the set of privacy constraints P and the set of utility constraints U thereby forming an anonymized dataset; and return the anonymized dataset to the enterprise.

9. The apparatus of claim 8, wherein the instructions further cause the processor to:

determine whether the enterprise identifies a set of predetermined privacy constraints;

responsive to the enterprise identifying the set of predetermined privacy constraints, augment the set of predetermined privacy constraints based on the set of privacy constraints P thereby forming a set of augmented privacy constraints AP; and incorporate the set of augmented privacy constraints AP into the set of privacy constraints P for use in anonymizing the sequential and location datasets.

10. The apparatus of claim 8, wherein the instructions to augment the set of predetermined privacy constraints based on the set of privacy constraints P further cause the processor to:

identify the set of predetermined privacy constraints identified by the enterprise;

for each predetermined privacy constraint in the set of predetermined privacy constraints:

compare each predetermined privacy constraint in the set of predetermined privacy constraints to each privacy constraint p in the privacy constraints P; and responsive to a predetermined privacy constraint conflicting with a privacy constraint p, augment the predetermined privacy constraint such that no conflict remains thereby forming the set of augmented privacy constraints AP; and incorporate the set of augmented privacy constraints AP into the set of privacy constraints P for use in anonymizing the sequential and location datasets.

11. The apparatus of claim 8, wherein the instructions to scan the sequential and location datasets to expose the set of privacy vulnerabilities further cause the processor to:

identify a set of locations a user has frequented;

associate a time value with each location in the set of locations;

for each distinct identified location/time pair:

calculate a frequency of occurrence in the sequential and location datasets;

for each location/time pair that appear only once in the sequential and location datasets, record the location/time pair as unsafe thereby indicating a privacy vulnerability;

for all the remaining location/time pairs:

scan a trajectory of each location time pair to produce one or more two-location/time pairs, responsive to identifying a unique two-location/time pair, record the two-location/time pair as unsafe thereby indicating a privacy vulnerability; and repeat the scanning and recording for increasingly larger location/time pairs without checking any supersets of already recorded location/time pairs; and for each recorded location/time pair, generate a privacy constraint p in the set of privacy constraints P.

12. The apparatus of claim 8, wherein the instructions to scan the sequential and location datasets to expose the set of privacy vulnerabilities further cause the processor to:

identify a set of locations a user has frequented;

associate a time value with each location in the set of locations;

for each location/time pair that appear only once in the sequential and location datasets and for each user in the sequential and location datasets:

given a pre-specified time periodicity, produce a transaction of the user following this time periodicity thereby forming a set of transactions; and execute a location/time pair pattern mining algorithm on the set of transactions to reveal frequent location/time pairs of the user in the sequential and location datasets; and for each identified frequent location/time pair of the user in the sequential and location datasets, responsive to a same location/time pair being found to be infrequent for a predetermined percentage of other users in the sequential and location datasets, generate a privacy constraint p in the set of privacy constraints P.

13. The apparatus of claim 8, wherein the instructions to anonymize the sequential and location datasets using the set of privacy constraints P and the set of utility constraints U further cause the processor to:

order the set of privacy constraints P based on a satisfiability criterion;

for each privacy constraint p in the set of privacy constraints P:

perform a spatiotemporal generalization based on the set of utility constraints U in order to satisfy the privacy constraint p;

responsive to satisfying the privacy constraint p using spatiotemporal generalization, generalize the privacy constraint;

responsive to an inability to satisfy the privacy constraint p using spatiotemporal generalization alone, perform selective suppression of location/time pairs associated with the privacy constraint p based on the set of utility constraints U;

responsive to the set of utility constraints U preventing the satisfaction of the privacy constraint p:

disregard the set of utility constraints U for the privacy constraint p; and satisfy the privacy constraint p; and update the sequential and location datasets in order to reflect the enforced data generalizations and suppressions, thereby generating the anonymized dataset.

* * * * *